United States Patent [19]

Kazama et al.

[11] Patent Number: 5,470,045
[45] Date of Patent: Nov. 28, 1995

[54] SOLENOID-ACTUATED DIAPHRAGM VALVE WITH BIASED DISC SPRING

[75] Inventors: Yoichiro Kazama, Kumagaya; Tomihisa Oyama, Fukaya, both of Japan

[73] Assignee: Hitachi Metals, Ltd., Tokyo, Japan

[21] Appl. No.: 283,751

[22] Filed: Aug. 1, 1994

[30] Foreign Application Priority Data

Aug. 2, 1993 [JP] Japan .................... 5-209868

[51] Int. Cl.⁶ ............................. F16K 31/02; F16K 7/14
[52] U.S. Cl. .................... 251/129.15; 251/129.17; 251/331
[58] Field of Search .............. 251/129.15, 331, 251/127.17

[56] References Cited

U.S. PATENT DOCUMENTS

| | | | |
|---|---|---|---|
| 3,134,932 | 5/1964 | Ray | 251/129.17 X |
| 4,813,647 | 3/1989 | Yagi et al. | 251/129.17 X |
| 5,046,701 | 9/1991 | Barber | 251/129.17 X |

FOREIGN PATENT DOCUMENTS

| | | |
|---|---|---|
| 2-309075 | 12/1990 | Japan . |
| 3-554 | 1/1991 | Japan . |
| 3-282079 | 12/1991 | Japan . |

*Primary Examiner*—Martin P. Schwadron
*Assistant Examiner*—Kevin L. Lee
*Attorney, Agent, or Firm*—Finnegan, Henderson, Farabow, Garrett & Dunner

[57] ABSTRACT

A valve apparatus wherein a diaphragm is provided above a valve seat in the valve body, employing a structure whereby the diaphragm can be depressed onto the valve seat, wherein a means of load is provided to depress the diaphragm, wherein an electromagnetic actuator is installed to separate the diaphragm from the valve seat, wherein a thin plate disc is provided with its center fixed to the periphery of the means of load and wherein a valve stem is positioned being fixed to the center of the thin plate disc. Driving the electromagnetic actuator, the valve stem is pulled up opposing the resilient force of the thin plate disc to allow the diaphragm to restore itself from its status being depressed onto the valve seat, thus controlling the aperture of the valve appropriately and smoothly. This invention therefore can provide a valve unit with a simplified structure but capable of maintaining a high cleanliness and improved flow rate controllability.

11 Claims, 6 Drawing Sheets

SOLENOID-ACTUATED DIAPHRAGM VALVE WITH BIASED DISC SPRING

BACKGROUND OF THE INVENTION

1. Field of the Invention

This invention relates to a valve apparatus for precision gas flow rate control which is capable of making accurate controls of the flow rate of comparatively smaller flow rate fluids such as gas.

2. Related Art

When producing products such as semiconductors, it generally becomes necessary to feed, such as, a very small quantity of processing gas under accurate control and, as the means for such flow rate control, such equipment as a precision gas flow rate control system is being used.

The type of gas flow rate control system usually consists of a sensor unit for detection of the flow rate of very small quantity gas, a valve structure and a control circuit thereof. The sensor unit is equipped with a sensor made of a capillary with an electric heating wire coil wound on it and the very small quantity gas of a minute percentage of the total gas flow passes through the capillary but the majority of gas flow is through a by-passing circuit. On the basis of the detection at this sensor unit, the control circuit controls the aperture of the valve with the valve unit to control the flow rate of the gas. In this case, for control of the aperture of the valve, because of the extremely small overall flow of the very small quantity gas, highly accurate control of the aperture of the valve within a stroke of such as tens of micro-meters becomes necessary. For the application, laminated piezoelectric elements are being used generally which can be used as an actuator being capable of causing larger variations in the thrust within a limited stroke.

To describe the structure of existing gas flow rate control systems referring to FIG. 7, a capillary 6 with a diameter of such as 0.5 mm or thereabout to flow a minute percentage of the overall gas flow rate connects both ends of a by-pass 4 of a fluid passage 2 and, around the capillary 6, a pair of electric heating wires 10 of the sensor unit 8 are wound. The pair of electric heating wires possessing a high resistance thermometer coefficient of such as 5,000 ppm/degree and two resistors are combined to constitute a bridge circuit allowing current flow from a constant current circuit 12. Heat is absorbed from the heating wire coil on the upstream side of the fluid passage by the gas flow, while heat is raised in the heating wire coil on the downstream side of the fluid passage, the heat transfer causing unbalance in the otherwise balanced bridge circuit and the potential difference occurring at this time is used as the flow rate signal.

The signal is amplified by the amplification circuit 14 before being input to the comparison control circuit 16 which compares the signal input and the reference flow rate to expand or contract a laminated piezoelectric element 20 of the valve unit 18 thus moving up and down a valve disc, or a diaphragm 22, to obtain an optimum aperture of the valve. The reason why a diaphragm 22 made of thin metal plate is being used as the valve disc is as follows.

With conventional valve units being provided with moving parts in the gas flow passage such as spring, when corrosive gas is used, the spring, etc. corrode or wear to generate particles which mix into the gas flow. Another reason is that, a high degree of cleanliness is being required for semiconductor production processes for the inherent micro-processing, while use of rubber or plastic materials as the valve disc tends to generate particles, such as, of chips which tend to cause more product rejects. However, by use of a metallic diaphragm, a valve disc of a simpler structure but with a higher cleanliness can be obtained.

Meanwhile, as aforementioned, by use of a laminated piezoelectric element 20 to activate the valve disc, or the diaphragm 22, the gas flow rate can be controlled within a very small stroke range of, such as, 100 μm but a laminated piezoelectric element 20 of this type is for a very small stroke and is very expensive, thus restricting the controllable flow rate range of such a valve unit 18 to a very narrow figure and raising the price. It may be possible to use an electromagnetic valve with which stable operation can be expected under comparatively high temperature environments in substitute to the combination of piezoelectric element 20 and diaphragm 22, but with electromagnetic valves of a conventional structure, the bobbin and plunger are exposed direct to gas flow which, when corrosive, generates particles to deteriorate the required high cleanliness.

Whereas, when using a metallic diaphragm as the valve disc, because of its inherently small displacement range, electromagnetic valves cannot provide stable control by its electromagnetic force only. In other words, while a large thrust can be obtained within a very small stroke range with the piezoelectric element 20, such a performance cannot be expected from an electromagnetic actuator and, moreover, since electromagnetic force which is being used by an electromagnetic actuator varies in inverse proportion to the square of the gap distance, the type of an actuator has not thus been able to perform appropriate controls of the aperture of a valve using diaphragm.

SUMMARY OF THE INVENTION

The present invention Intends to provide a valve apparatus with a simpler structure and low price but being capable of contributing to a high cleanliness and of maintaining a high flow rate controllability.

The present Invention also intends to provide a valve apparatus which can contribute to a high cleanliness and can constantly maintain a high flow rate controllability using lower cost component parts, taking advantage of spring characteristics of a thin plate disc to control abrupt variations in the attraction force of the actuator.

The valve apparatus of the present invention, in sum, includes a valve body being equipped with a fluid inlet port, fluid outlet port and valve seat provided between them, a diaphragm positioned to face the valve seat and with its periphery fastened, a means of load, also called a loading means provided at the opposite side of the valve seat across the diaphragm and an electromagnetic actuator which works to separate the diaphragm from the valve seat, running counter to the means of load, plus a thin plate disc to the periphery of which the means of load is fixed and a valve stem fixed to the center of the thin plate disc.

Owing to the aforementioned construction, the valve disc, or the diaphragm, is normally depressed toward the valve seat of the valve body by the resilient force of the thin plate disc as the means of load. For regulation of the aperture of the valve, the electromagnetic actuator which comprises, for example, of an electromagnetic coil is activated to attract the valve stem to separate the diaphragm from the valve seat. In this case, although the attraction force by the electromagnetic actuator increases in inverse proportion to the square of the gap distance, resilient force of the thin the disc works to counteract properly to the attraction force of the electromagnetic actuator, thus providing smooth and almost linear control of the aperture of the valve.

DETAILED DESCRIPTION OF THE PREFERRED EMBODIMENT

Figure 1:
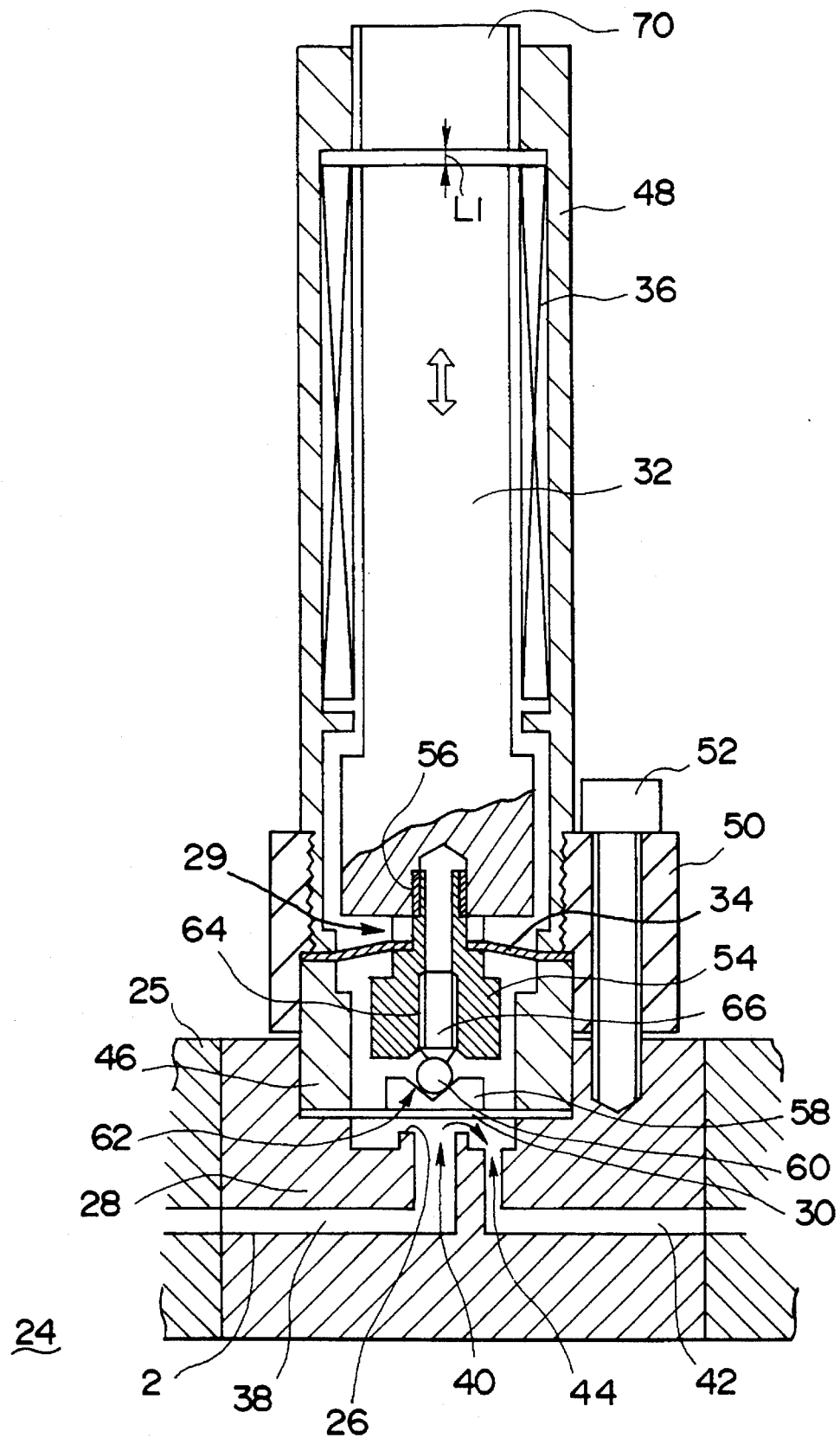
FIG. 1 is a block diagram showing a valve apparatus of this invention.
Figure 7:
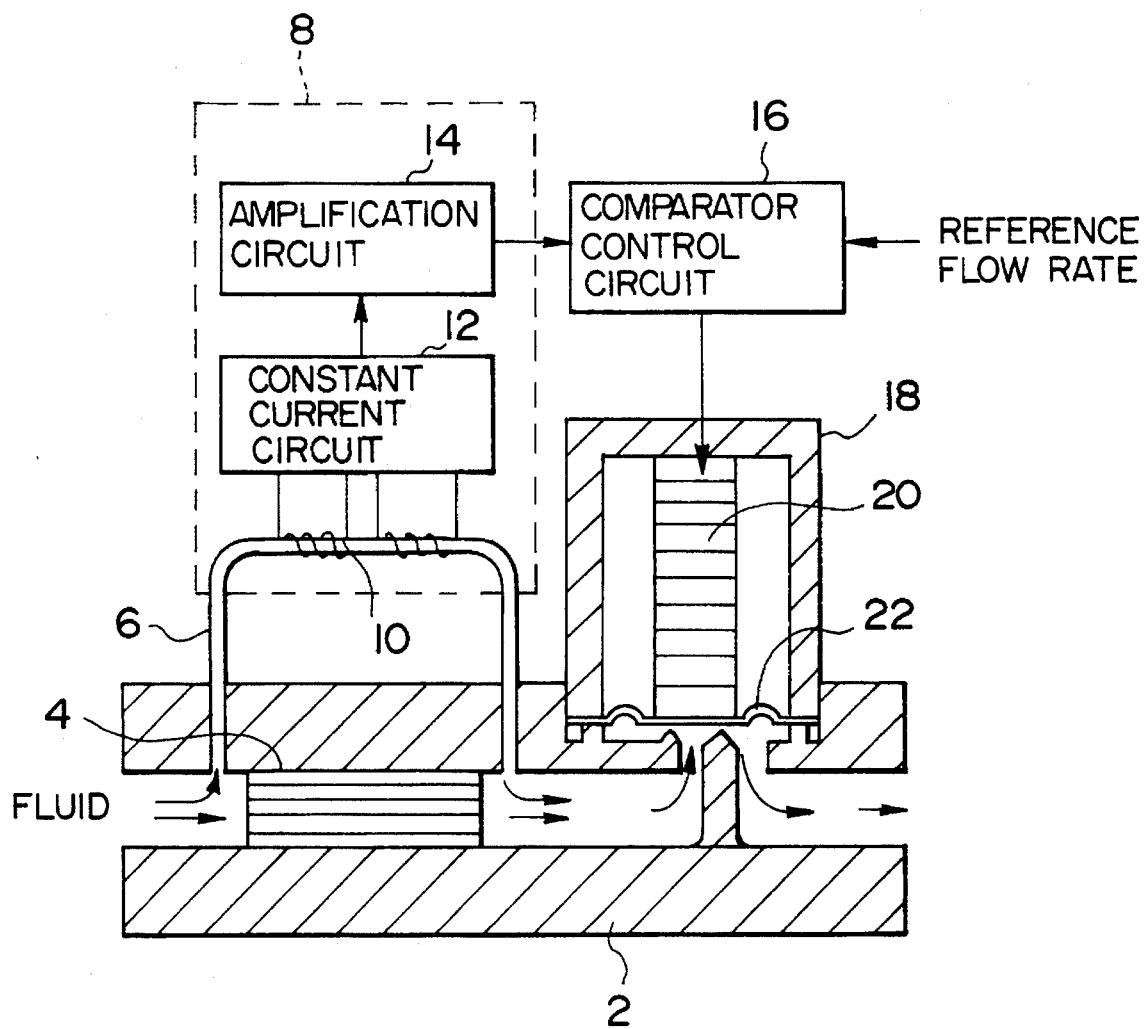
FIG. 7 is a schematic section diagram showing a flow rate control system employing a conventional valve apparatus.

Referring more particularly to an exemplary embodiment of the valve apparatus of this invention with reference initially to FIG. 1 of the attached drawings, similar to the system shown as FIG. 7, the valve apparatus 24 of this invention constitutes a part of a gas flow control system to be installed to a fluid passage to flow fluids such as gas and is installed to a piping 25 under a totally detachable means. The valve apparatus 24 consists mainly of a valve body 28 equipped with a valve seat 26, a diaphragm 30 made of the thin plate positioned to face the valve seat 26 with its periphery fixed down designed to seat on the valve seat 26, a means of load 29 provided at the opposite side of the valve seat 26 across the diaphragm 30 which works to cause displacement of the diaphragm 30 toward the valve seat and an electromagnetic actuator 36 equipped with an electromagnetic coil and a plunger which counteracts against the means of load to separate the diaphragm 30 from the valve seat 26. The means of load 29 consists mainly of a thin plate disc 34 with its periphery fixed to the valve body and a presser 54 fixed to the center of the thin plate disc with a portion of its structure piercing through the thin plate disc.

More specifically, the valve body 28 is detachably installed to a piping 25, working as a fluid passage as aforesaid, and inside the valve body, a fluid inlet port 40 with a round opening inside and connecting at the other end to the fluid channel 38 and a fluid outlet 44 with a round opening inside and connecting at the other end to the fluid channel 42 are provided. The fluid inlet port 40 is structured into a form projecting upward for a minute distance from the bottom of the cavity in the valve body, thus the opening edge into the valve body cavity constituting the valve seat 26. Above the valve seat 26, a diaphragm 30 of a diameter of about 22 mm being made of such as stainless steel being positioned apart from the valve seat 26 by, for example, 100 μm when it is in flat state is provided in a horizontal direction in the drawing, means perpendicular to the axial direction of the valve stem 32, as the valve disc with its periphery fixed by a diaphragm fixing member 46. The rigidity of the diaphragm 30 is very high and only a slight deformation causes a large stress. The diaphragm 30 is positioned in alignment with the center of the valve seat 26 and so designed that it can completely close the valve seat opening when necessary.

Upright on the valve body 28, as shown in FIG. 1, the drawing, a cylindrically shaped valve stem casing 48 is structured with its bottom end implanted into a casing support member 50 by such as threading and the casing support member being fixed to the valve body 28 using screws 52.

The valve stem 32 is housed in the valve stem casing 48 in a state movable vertically, means in the axial direction of the valve stem, such valve stem being structured to have a diameter of about 12 mm and provided with a presser 54 which is detachably installed into the bottom end of the valve stem by threading 56. Between the bottom center of the presser 54 and a cylindrically shaped receiver 58 being provided on the upper surface, in the center, of the diaphragm 30, a steel ball 60 is placed, the steel ball 60 being housed within a conically shaped dent 62 so that the steel ball 60 may transfer force uniformly to the diaphragm 30 even when the force being applied onto the steel ball may be partial. Also, through the center of the presser 54, a through hole 64 is formed, into the bottom end of which, an adjusting screw 66 with its bottom end conically shaped to receive the steel ball 60 is threaded in for necessary adjustment.

Figure 2:
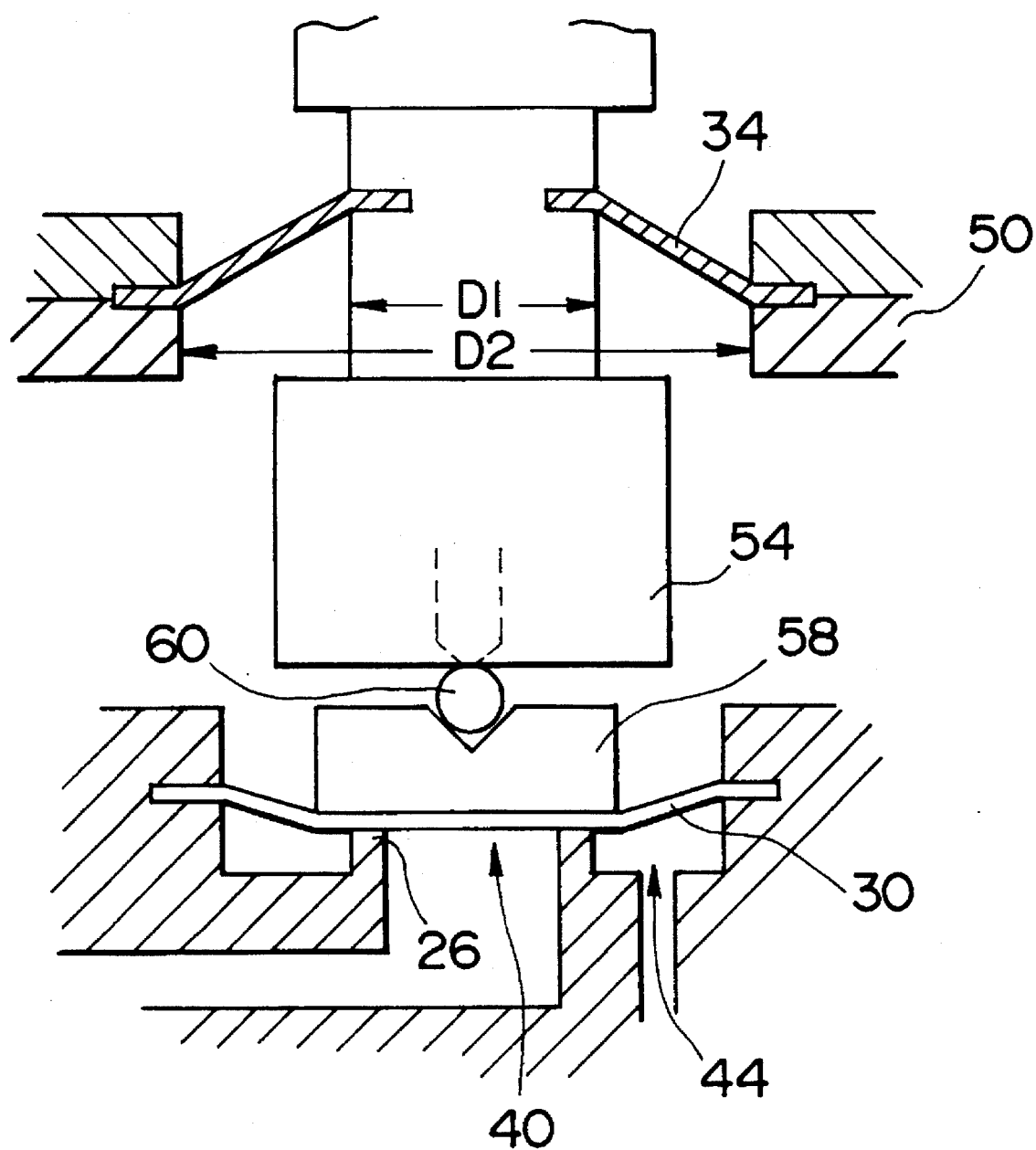
FIG. 2 is an enlarged view showing the total closure state of the valve.
Figure 5:
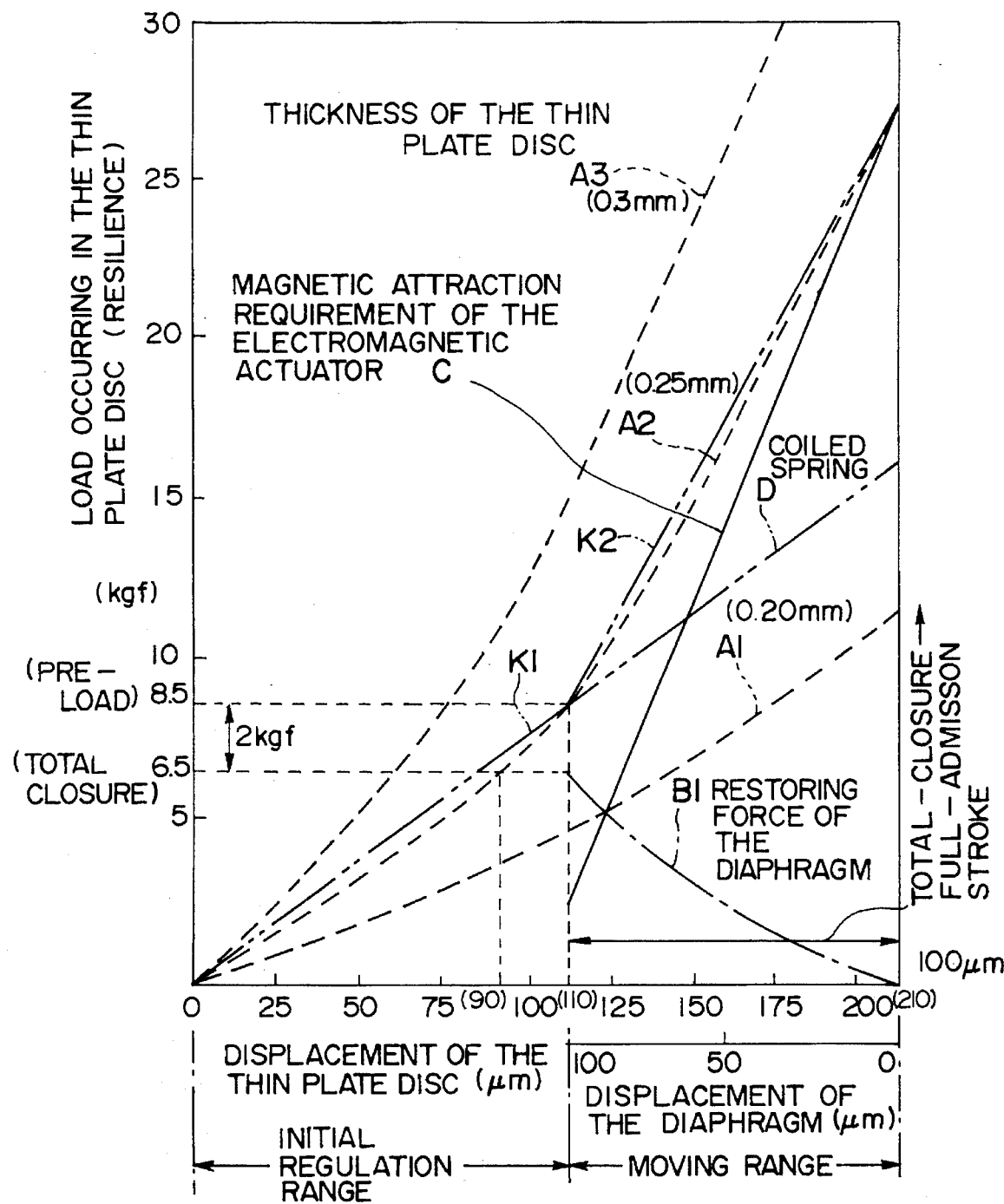
FIG. 5 indicates combinations of graphs representing relations between loads causing displacement of the thin plate disc and the restoring force of the diaphragm.
Figure 6:
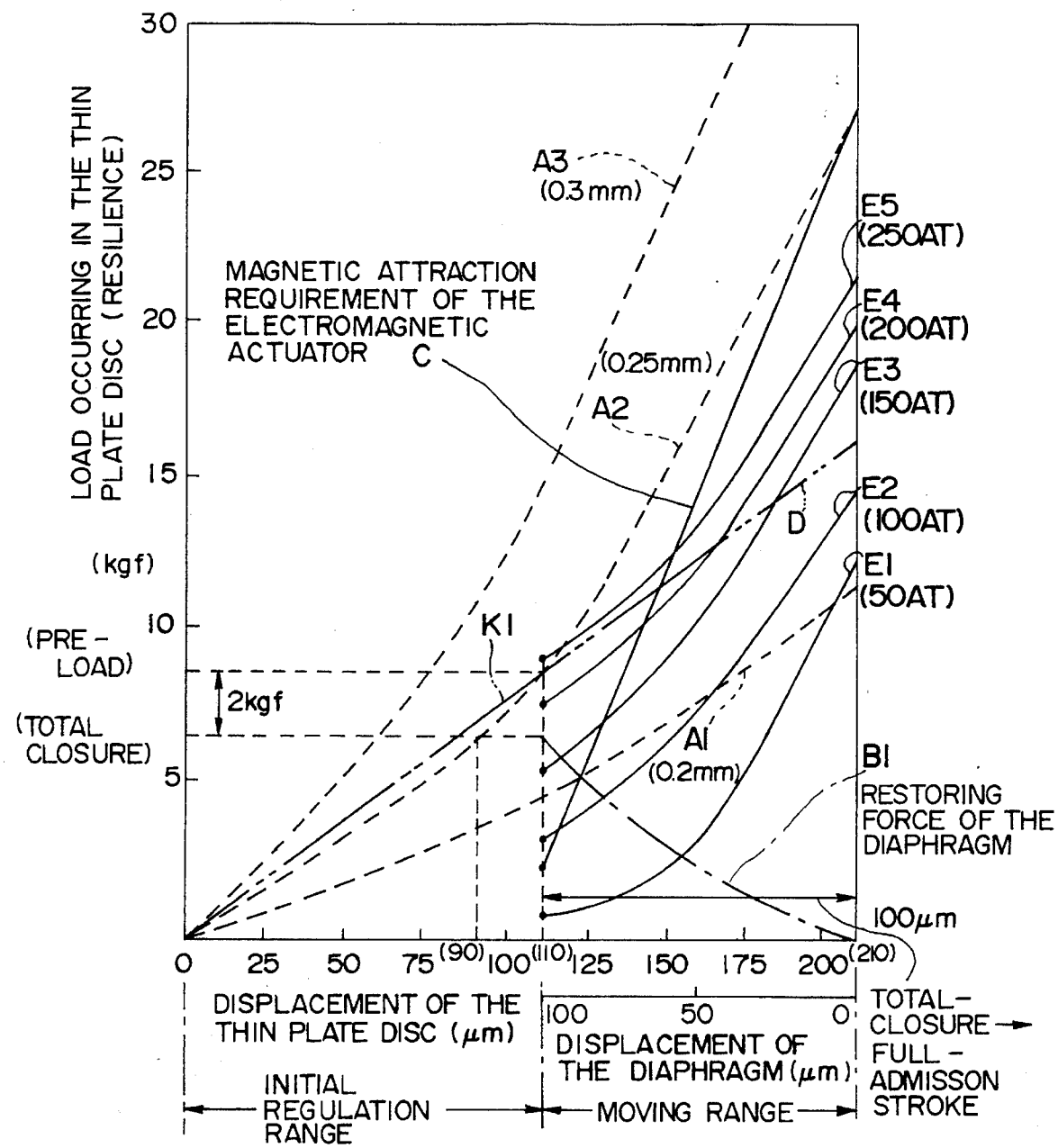
FIG. 6 shows combinations of graphs representing attraction force characteristics being generated by the electromagnetic actuator and graphs representing the characteristics shown in FIG. 5.

The thin plate disc 34 which presses the presser 54 downward in the drawing, means toward the valve seat is provided with an insertion hole 68 in its center functioning as a disc spring of about 22 mm of a diameter. Into the insertion hole 68, the upper section of the presser 54 is inserted and the thin plate disc and the presser 54 are fixed by means of a fixing ring 71 and the periphery of the thin plate disc 34 is fixed to the casing support member 50. Thus, the thin plate disc 34 Is so structured to make springy displacement together with the valve stem 32 with its periphery stationarily fixed. The thin plate disc is made of, such as, nickel alloy with a thickness of 0.25 mm and its inner diameter D1 when installed is set to, for example, 7 mm and the outer diameter D2 is designed to, for example, 16 mm. The relations between the displacement occurring in such a thin plate disc 34 working as a flat spring and the load being applied are indicated in FIG. 5 and FIG. 6 and the spring characteristics of the thin plate disc 34 is so determined that the mean spring constant K2 while the diaphragm is being activated toward the separating direction from the valve seat 26 by the electromagnetic actuator 36 is 1.2 to 3 times as much as the mean sprint constant K1 during the initial setting range whereby the diaphragm 30 is displaced as far as it contact to close the valve seat 26. In this exemplary embodiment, as shown in FIG. 2. when the valve is totally closed, means when the displacement of the diaphragm 30 is, for example, at about 100 μm, the thin plate disc is so structured that its center section is being displaced in an upward convex shape, thus applying pre-pressure onto the diaphragm 30. The displacement of the thin plate disc at this time shall be about 110 μm inclusive the pre-pressure component. Consequently, even when the thin plate disc 34 is pulled up by the electromagnetic actuator to increase the aperture of the valve to deform upward from the total closure state of the valve as is indicated by the assumption line in the drawing, the mean spring constant at this time increases 1.2 to 3 times as much as with the prior displacements, opposing against the attraction force by the electromagnetic actuator which tends to vary sharply depending on the distance thus rounding off the abrupt displacement guaranteeing a smoother displacement, means smoother change in the aperture of the valve.

In case of the aforementioned embodiment, when making initial setting (total closure) of the thin plate disc 34, the adjusting screw 66 provided through the center of the presser 54 can be screwed In and out to accomplish the purpose, and when modifying the spring constant of the thin plate disc 34, optimum choices of the thickness "t" of the thin plate disc and of the inner diameter D1 and the outer diameter D2, when installed, of the thin plate disc shall do the purpose. While the top end of the valve stem 32 is designed slightly shorter than the level reaching the inner ceiling of the casing by a distance L1, for example, about 100 μm which determines the maximum stroke of the valve stem 32. In the top surface, means through the ceiling, of the casing 48, a gap regulation member 70 is adjustably inserted by such a means as threading, which is movable forward or reverse in the longitudinal direction of the valve stem, thus enabling to make adjustment of the stroke of the valve stem 32.

Referring then to the operation of the exemplary embodiment of this invention, first, majority of fluid such as gas flowing through a fluid passage 2 passes through a bypass 4 and only a certain flow-dividing ratio of fluid passes through the capillary 6. (See FIG. 7.) Fluid passing through the capillary proceeds to the fluid inlet port 40 through the fluid inlet channel 38 of the valve unit 24 before passing through the inner structure of the valve body 28 to flow out through the fluid outlet port 44 into the fluid outlet channel 42. (See FIG. 1.) The sensor 8 detects the overall flow rate of the fluid passing through the capillary 6 to transfer the information to the comparison control circuit 16 whereat the data are compared with the reference flow rate data being input externally. (See FIG. 6.) This comparison control circuit 16, then, applies a driving current to the electromagnetic coil of the electromagnetic actuator 36 of the valve unit 24 to regulate the aperture of the valve in such a manner that the overall flow rate may maintain the reference flow rate. (See FIG. 1.)

To make a specific explanation of an example of the circumstances wherein the electromagnetic actuator 36 attracts and gradually pulls up the valve stem 32 to increase the aperture of the valve gradually. FIG. 5 shows combinations of graphs representing the relations between displacement of the thin plate disc and resultant occurrence of loads (resilient force) and the restoring force of the diaphragm and FIG. 6 indicates combinations of graphs representing the attraction force characteristics being generated by the electromagnetic actuator 36 and graphs representing the characteristics shown in FIG. 5.

To give a brief explanation of the initial setting and operation of the valve unit of this exemplary embodiment, first, when making initial setting, gradually screw in the adjusting screw 66, with the valve stem casing 48, electromagnetic actuator 36 and valve stem 32 detached from the casing support member 50 and the presser 54, respectively, toward the diaphragm 30 side to bend the diaphragm 30 toward the valve seat 26 as shown in FIG. 2, in other words, downward in the drawing. At this time, the thin plate disc 34 is being bent upward in its center part into an upward convex shape by the restoring force of the diaphragm 30 as shown in the drawing. Further from the point where the diaphragm 30 contacts the valve seat (total closure state), a pre-pressure of, for example, 2 kgf is added to secure a perfect closure without leaks by further screwing in adjusting screw 66.

After thus completing the initial setting, reassemble the valve stem 32, valve stem casing 48 and electromagnetic actuator 36 back into their positions before starting the valve unit operation.

When making controls of a minute gas flow, apply current into the electromagnetic actuator 36 to cause its attraction force and the valve stem 32 is pulled upward for the amount of current flowing through the electromagnetic actuator, thus gradually lessening the gap distance between the valve stem 32 and the gap regulation member 70. At this time, since the electromagnetic attraction force increases in inverse proportion to almost the square of the distance, as the valve stem 32 rises, the attraction force increases sharply in, such as, a quadratic curve.

Nevertheless, in this exemplary embodiment, since the mean spring constant of the thin plate disc 34 which deforms at this time is so prescribed that it becomes 1.2 to 3 times larger than the mean spring constant of the displacement made by the aforementioned initial setting, the aforesaid abrupt increase of attraction force of the electromagnetic actuator 36 is offset by the increased mean spring constant of the thin plate disc 34, as aforesaid, resulting to obtain aperture variations of the valve almost in proportion to the amount of the driving current flowing through the electromagnetic actuator 36, thus enabling to make appropriate controls of a minute gas flow. Meanwhile, similar processes occur when the valve stem 32 is pressed downward to lessen the aperture of the valve, thus availing proper controls of a minute gas flow.

Although it usually is very difficult to control a trace of displacement of a diaphragm which can only change in a vertical stroke by about 100 μm using an electromagnetic actuator wherewith the electromagnetic attraction force varies in proportion to the square of the distance, by optimum use of a thin plate disc possessing the aforementioned characteristics, namely by setting the mean spring constant K2 of the movement to separate the diaphragm from the valve seat by means of the electromagnetic actuator to 1.2 to 3 times larger than the mean spring constant K1 of the initialization wherein the diaphragm is bent until it contacts the valve seat, it becomes possible to make appropriate controls of a minute gas flow.

Since the aforementioned explanations of the operation have been comparatively qualitative, quantitative explanations shall be given referring to FIG. 5 and FIG. 6. Like aforesaid, FIG. 5 shows combinations of graphs representing the displacement of the thin plate disc and resultant occurrence of loads (resilient force) and the restoring force of the diaphragm and FIG. 6 shows combinations of graphs representing the attraction force characteristics being generated by the electromagnetic actuator and graphs representing characteristics shown in FIG. 5.

In FIG. 5, as well as displacement of the thin place disc, displacement of the diaphragm also is given in the axis of abscissa. The displacement of the thin plate disc and of diaphragm changes separately and independently during the initialization range but once the initial setting is completed and normal operation starts, these two parts make displacement uniformly and the combined indication of displacement of the two parts in FIG. 5 is to simplify the explanation of the relation of respective resilient force at this time.

Figure 3:
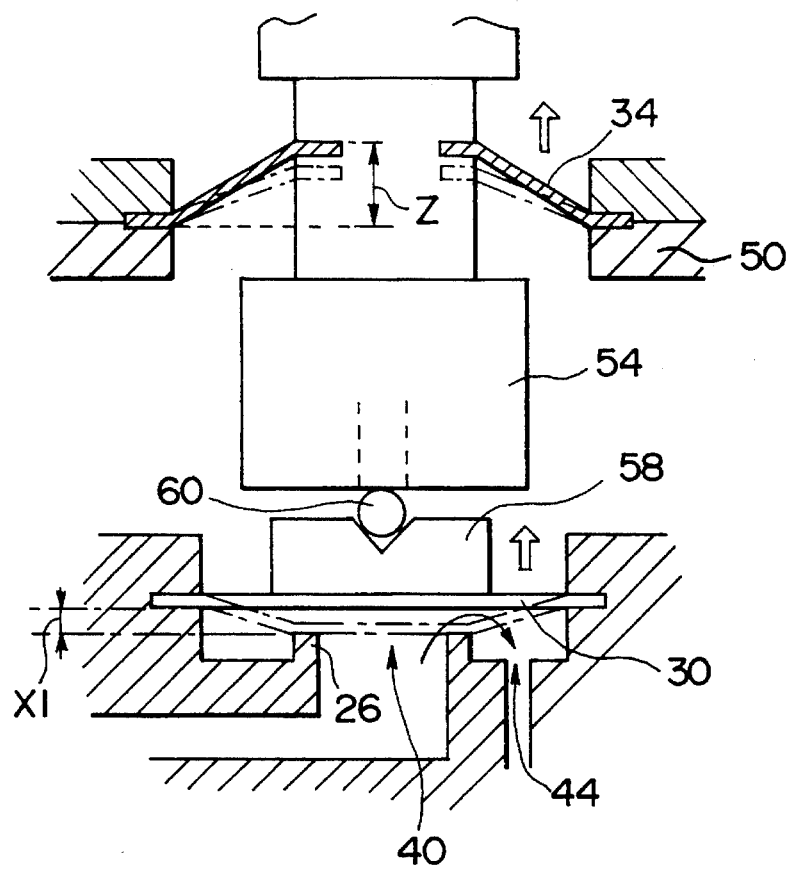
FIG. 3 is an enlarged view of the opened status of the valve.
Figure 4:
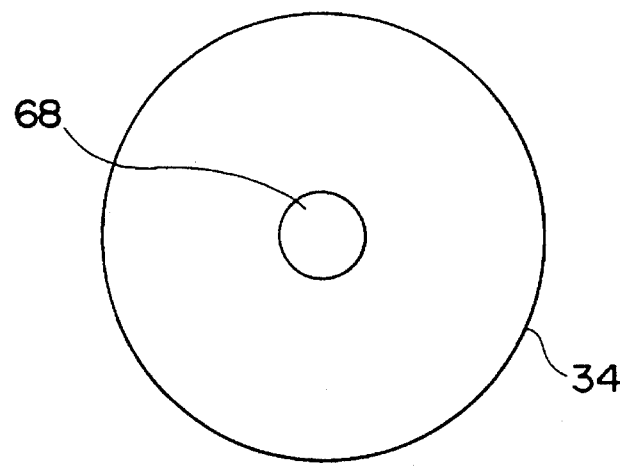
FIG. 4 is a plan view of a resilient part being used for the system as per the above FIG. 1.

In this explanation, assuming the distance X1, means stroke, between the valve seat 26 and the diaphragm when it is in flat status, or no-load status, to be 100 μm (see FIG. 3), spring characteristics of the thin plate disc 34 when its thickness "t" is at 0.20 mm, 0.25 mm and 0.30 mm are given as curves A1, A2 and A3. In this case, in the axis of abscissa, displacement Z is being given. (See FIG. 3). The restoring force of the diaphragm 30 is given as the curve B1 and the displacement reaches the maximum value of 100 μm at its total closure state, whereat the restoring force of the diaphragm 30 also reaches the largest point and, as the valve proceeds to open its aperture, the displacement gradually decreases and the displacement becomes zero at the time of total closure with the restoring force of the diaphragm 30 also becoming zero. In other words, within its working range, this diaphragm always reacts in the same direction of the attraction force of the electromagnetic actuator, means in counter to the direction of the resilient force of the thin plate disc 34.

Here, attention should be paid to the fact that the spring characteristics of the aforementioned three types of thin plate disc 34 involve gradually increasing spring constant (gradient of the curves) of these discs as their displacement changes. Installing a thin plate disc 34 possessing the aforementioned characteristics into a valve apparatus, perform initial setting as aforesaid. Such setting can be made by screwing in of the adjusting screw 66 and displacement of the thin place disc 34, maintaining its upward convex shape, moves on the curve A1, A2 or A3 toward the right-hand side, while the diaphragm 30 deforms to a downward convex shape to move on the curve B1 toward the left-hand side and respective displacement occurs with these forces being counterpoised.

Turning attention to the curve A2 of the thin plate disc 34 with the thickness of 0.25 mm, when its displacement reaches 90 μm, the displacement of the diaphragm becomes 100 μm, means total closure state, and a load of about 6.5 kgf occurs with either of them. When advancing the displacement of the thin plate disc 34 by further 20 μm down to 110 μm in order to apply a pre-pressure for perfect stoppage of gas flow, the resilient force of the thin plate disc 36 becomes about 8.5 kgf thus providing a pre-pressure of about 2.0 kgf. This concludes the initial setting stage.

Proceeding further to normal gas flow control operations, driving current is applied into the electromagnetic actuator 36 to pull up the valve stem 32 gradually. At the time, the resilient force of the thin plate disc 34 works opposite to the electromagnetic attraction force, while the restoring force of the diaphragm 30 works in the same direction as of the electromagnetic attraction force, means in the direction adding to it. This means that the reaction moves on the curve B1 from the left toward right-hand side.

At this time, since the adjusting screw 66 is not being touched throughout the span of the movements, the diaphragm and thin plate disc make identical changes by the same amount of respective displacement, different from the aforementioned case of initialization processes.

Consequently, the electromagnetic attraction force requirement with the electromagnetic actuator 36 can be indicated as the curve C, means subtracting the curve B1 of the resilient force of the diaphragm from the curve A2 of the resilient force of the thin plate disc.

Meanwhile, the curve D in the diagram stands for spring characteristics of an ordinary coiled spring, given for reference, and its resilience is linearly varying against its displacement.

To examine the relation between the electromagnetic attraction force requirement with the electromagnetic actuator obtained as in the preceding paragraph and the driving current AT (ampere turn) to be applied to the actuator, referring to FIG. 6. In the diagram, curves E1, E2, E3, E4 and E5 stands for characteristics of 50 AT, 100 AT, 150 AT, 200 AT and 250 AT, respectively, and as the displacement of the thin plate disc 34 increases, means as the distance between the cap regulation member 70 and valve stem 32 becomes shorter, the attraction force requirement increases sharply.

To pay attention to the curve C standing for the attraction force requirement with the electromagnetic actuator, it proves to cross with each of respective curves E2 through E5 at one point, excluding the curve E1. This means that at each crossing point with curves E2 through E5, excluding E1, the corresponding AT (ampere turn) determines the equivalent aperture of the valve constantly. In other words, by changing the driving current AT, excluding 50 AT being applied to the electromagnetic actuator, corresponding aperture of the valve can be expected, thus making it possible to control the aperture of the valve optionally and constantly.

In this case, when the gradient of the curve C obtained in the previous paragraph is too small and if this curve C happens to have two cross points with a single AT (ampere turn) curve, two valve aperture determination points occur with a sing type of AT, thus making the aperture control unreliable rendering this control method invalid.

Also, when the gradient of this curve C is too small, like with the case mentioned in the preceding paragraph and if it crosses with only a portion of the different AT curves (such as with the electromagnetic attraction force requirement curve (not given in the diagram) with the electromagnetic actuator corresponding to the curve A1 for 0.20 mm thick disc or the curve D for the coiled spring), the displacement of the thin plate disc corresponding to only a trifle change in the driving current becomes too large, thus making a reliable valve aperture control ineffective. Also, in this case, since the variation in the thin plate disc displacement becomes to large, it may exceed the displace tolerance of the thin plate disc to cause damage in it.

While, if the gradient of the curve C is too large, means too steep, and when it crosses with all the given AT curves within a small range of displacement (such as in case of the electromagnetic attraction force requirement curve (not given in the diagram) with the actuator corresponding to the curve A3 of 0.30 mm thick disc), a very wide range of driving current AT variations becomes necessary, which is not too practical. Therefore, thin plate discs 34 with spring characteristics within a limited range can only suit appropriate aperture controls of the valve and spring characteristics within such range are, as aforementioned, those which possess a mean spring constant K2 for the movement range of separating the diaphragm from the valve seat by the electromagnetic actuator is at 1.2 to 3 times as much as the mean spring constant K1 to deform the diaphragm until it contacts the valve scat, means during the initialization range. If the spring constant K2 becomes less than 1.2 times of K1, a tendency such as being shown by the curve A1 occurs making it impossible to effect appropriate controls of the valve aperture, and when, in contrary, the spring constant K2 becomes more than 3 times of K1, a tendency such as being shown by the curve A3 occurs requiring too wide range availability of the driving current, thus proving the fact that a thin plate disc with a thickness of 0.25 mm or thereabout exhibits the most suitable characteristics with the case indicated in this diagram.

Namely, in regard to the spring characteristic of the thin plate disc, as against the mean gradient of the curve representing the relation between the displacement needed to deform the diaphragm from its flat, or no-load, state until it is bent down to become total closure status (inclusive pre-pressure) and the occurring loads, the mean gradient representing the changes occurring within the stroke of pre-pressured total closure state to the full admission state should be steeper to a certain degree.

As aforementioned, by use of a thin plate disc possessing appropriate spring characteristics, if an electromagnetic actuator which usually varies in its attraction force in proportion to the square of the distance is used for a diaphragm with, for example, only a 100 μm displacement range allowed for its function, an appropriate and almost linear control becomes possible.

Meanwhile, although the aforesaid exemplary embodiment is for a case of using a single thin plate disc, multiple number of, for example 2, thin plate discs may of course be used as far as the structure can exhibit such spring characteristics as, for example, are given as the curve A2 in FIG. 5.

Moreover, with the aforesaid exemplary embodiment, a steel ball 60 is being inserted above the diaphragm 30 and even when the pressing force coming through the valve stem 32 becomes partial, the steel ball 60 works to transfer the pressing force uniformly onto the diaphragm.

Furthermore, since the section inside the valve body 28 where the gas fluid flows through is of a simplified structure with the diaphragm 30 only provided as the dividing means, thus eliminating possibility of causing particles and mixing them into gas fluids to maintain a high cleanliness.

Also, to substitute the electromagnetic actuator, an actuator using some other lower cost drive means instead of the electromagnetic coil, such as Coulomb force, may also be employed.

In addition, although a flat shape diaphragm was used with the aforementioned exemplary embodiment, the diaphragm does not always have to be flat but it can be corrugated. By use of such a diaphragm, the allowable stress can be lowered.

As aforementioned, a valve unit of this invention exhibits superb advantages given below.

Since abrupt changes in the attraction force of the actuator is being controlled making use of spring characteristics of a thin plate disc, a high cleanliness can be maintained and high flow rate controllability can be constantly maintained using low cost parts.

The invention may be embodied in other specific forms without departing from the spirit, or essential characteristics thereof. Also, the scope of the invention being indicated by all the appended claims rather than the foregoing description and all changes which come within the meaning and range of equivalency of the claims are therefore intended to be embraced therein.

What we claim is:

1. A valve apparatus comprising:

a valve body having a fluid inlet port, a fluid outlet port and a valve seat separating said inlet and outlet ports;

a flexible diaphragm positioned in an unflexed condition to face, and be spaced from, said valve seat, said diaphragm having a periphery fixed relative to said valve body;

a loading means provided at the opposite side of the diaphragm from the valve seat for causing flexing displacement of the diaphragm toward said valve seat, wherein said loading means includes a thin plate annularly continuous disc having a center and an outer periphery, and fastened around the outer periphery relative to said valve body;

a valve stem operatively connected to the center of said thin plate disc; and an electromagnetic actuator operatively connected to said valve stem for selectively Urging said disc counter to said loading means, whereby said diaphragm can flex away from said valve seat.

2. A valve apparatus comprising:

a valve body having a fluid inlet port, a fluid outlet port, and a valve seat separating said inlet and outlet ports;

a flexible diaphragm positioned in an unflexed condition to face, and be spaced from, said valve seat, said diaphragm having a periphery fixed relative to said valve body;

a loading means provided at the opposite side of the diaphragm from the valve seat for causing flexing displacement of the diaphragm toward said valve seat, wherein said loading means includes a thin plate annularly continuous disc having a center and an outer periphery, and fastened around the outer periphery relative to said valve body;

a valve stem operatively connected to the center of said thin plate disc; and an electromagnetic actuator operatively connected to said valve stem for selectively urging said disc counter to said loading means, whereby said diaphragm can flex away from said valve seat, wherein said loading means is equipped with an adjusting means to depress said diaphragm onto said valve seat.

3. A valve apparatus comprising:

a valve body having a fluid inlet port, a fluid outlet port, and a valve seat separating said inlet and outlet ports;

a flexible diaphragm positioned in an unflexed condition, and be spaced from, said valve seat, said diaphragm having a periphery fixed relative to said valve body;

a loading means provided at the opposite side across said diaphragm from said valve seat for providing spring force biasing said diaphragm toward said valve seat; and an electromagnetic actuator operatively connected to said loading means for selectively countering said spring force for allowing said diaphragm to flexibly move away from said valve seat;

wherein, the spring force biasing characteristics of said loading means have a mean spring constant during the movement range wherein said electromagnetic actuator is activated to allow said diaphragm to separate from said valve seat 1.2 to 3 times the mean spring constant during an initialization range wherein said diaphragm is flexed until it is depressed by said loading means onto said valve seat.

4. The valve apparatus according to claim 3, wherein said means of load is equipped with an adjustment means to depress said diaphragm onto said valve seat.

5. The valve apparatus according to claim 1, wherein said loading means includes a presser assembly for engaging said diaphragm, said presser assembly including a ball member for uniformly transmitting force to said diaphragm.

6. The valve apparatus according to claim 5, wherein said presser assembly also includes a screw member receivingly seating said ball member for adjustably depressing said diaphragm onto said valve seat.

7. The valve apparatus according to claim 1, wherein said loading means is configured for applying a unidirectional force to said diaphragm.

8. The valve apparatus according to claim 7, wherein said loading means includes a force-applying member having a curved contact surface, and wherein said diaphragm includes a dent member facing said force-applying member for receiving said contact surface.

9. The valve apparatus according to claim 3, wherein said loading means includes a disc shaped spring.

10. The valve apparatus according to claim 3, wherein said loading means includes a ball member for uniformly engaging said diaphragm.

11. The valve apparatus according to claim 3, wherein said loading means includes a presser assembly including a disc shaped spring, a ball member, and an adjustment screw disposed between said disc spring and said ball member.

* * * * *